US012568303B2

(12) United States Patent
Zhang

(10) Patent No.: US 12,568,303 B2
(45) Date of Patent: Mar. 3, 2026

(54) METHOD, APPARATUS, DEVICE, AND STORAGE MEDIUM FOR GENERATING A CO-SHOT RESULTANT VIDEO BASED ON ONE OR MORE MULTIMEDIA RESOURCES

(71) Applicant: Beijing Zitiao Network Technology Co., Ltd., Beijing (CN)

(72) Inventor: Shupeng Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 51 days.

(21) Appl. No.: 18/689,063

(22) PCT Filed: Sep. 19, 2022

(86) PCT No.: PCT/CN2022/119537
§ 371 (c)(1),
(2) Date: Mar. 4, 2024

(87) PCT Pub. No.: WO2023/051295
PCT Pub. Date: Apr. 6, 2023

(65) Prior Publication Data
US 2024/0284036 A1 Aug. 22, 2024

(30) Foreign Application Priority Data
Sep. 28, 2021 (CN) .......................... 202111142672.2

(51) Int. Cl.
*H04N 23/63* (2023.01)
*H04N 23/667* (2023.01)

(52) U.S. Cl.
CPC ......... *H04N 23/632* (2023.01); *H04N 23/667* (2023.01)

(58) Field of Classification Search
CPC .... H04N 23/632; H04N 23/667; H04N 5/265; H04N 5/262
USPC ....................................................... 348/222.1
See application file for complete search history.

(56) References Cited

U.S. PATENT DOCUMENTS

| | | | |
|---|---|---|---|
| 2006/0120623 A1 | 6/2006 | Tsukamoto et al. | |
| 2017/0294045 A1 * | 10/2017 | Cabral | ...................... G06T 5/50 |
| 2021/0014415 A1 | 1/2021 | Wei | |

(Continued)

FOREIGN PATENT DOCUMENTS

| | | | |
|---|---|---|---|
| CN | 109005352 A | 12/2018 | |
| CN | 109151360 A * | 1/2019 | ....... H04N 21/44016 |
| CN | 110121094 A | 8/2019 | |

(Continued)

OTHER PUBLICATIONS

Extended european search report for application No. 22874682.2, Nov. 26, 2024, 13 pages.

(Continued)

*Primary Examiner* — Usman A Khan

(57) ABSTRACT

The disclosure provides a method and apparatus for generating a video, a device, and a storage medium. The method includes: displaying, in response to a triggering operation for a preset co-shooting control on a shooting page, at least two canvases on the shooting page; determining multimedia resources corresponding to the at least two canvases respectively; and generating a co-shot resultant video based on the multimedia resources corresponding to the at least two canvases respectively.

20 Claims, 9 Drawing Sheets

Display, in response to a triggering operation for a preset co-shooting control on a shooting page, at least two canvases on the shooting page — S101

Determine multimedia resources corresponding to each of the at least two canvases respectively — S102

Generate a co-shot resultant video based on the multimedia resources corresponding to the at least two canvases respectively — S103

(56)  References Cited

U.S. PATENT DOCUMENTS

| | | | | |
|---|---|---|---|---|
| 2021/0103736 A1* | 4/2021 | Toyoda | ................. | G06V 20/46 |
| 2021/0297604 A1 | 9/2021 | Matiossian | | |

FOREIGN PATENT DOCUMENTS

| | | | | | |
|---|---|---|---|---|---|
| CN | 110891191 A | | 3/2020 | | |
| CN | 110913244 A | | 3/2020 | | |
| CN | 112422846 A | | 2/2021 | | |
| CN | 112911379 A | | 6/2021 | | |
| CN | 113068053 A | | 7/2021 | | |
| CN | 113395588 A | * | 9/2021 | ............ | H04N 23/80 |
| JP | 2013-012934 A | | 1/2013 | | |
| JP | 2013-042274 A | | 2/2013 | | |
| JP | 2014086787 A | | 5/2014 | | |
| JP | 2014175850 A | | 9/2014 | | |
| JP | 2017026828 A | | 2/2017 | | |
| JP | 2021033982 A | | 3/2021 | | |
| WO | 2005015899 A1 | | 2/2005 | | |

OTHER PUBLICATIONS

International Search Report and Written Opinion for International Application No. PCT/CN2022/119537, mailed Dec. 8, 2022, 13 Pages.
First Office Action for Chinese Application No. 202111142672.2, mailed Feb. 26, 2025, 14 Pages.
Notice of Refusal for Japanese Patent Application No. 2024518853, mailed on Apr. 1, 2025, 23 pages.
Office action received from Japanese patent application No. 2024-518853 mailed on Jul. 22, 2025, 3 pages.

* cited by examiner

1

METHOD, APPARATUS, DEVICE, AND STORAGE MEDIUM FOR GENERATING A CO-SHOT RESULTANT VIDEO BASED ON ONE OR MORE MULTIMEDIA RESOURCES

CROSS REFERENCE TO RELATED APPLICATIONS

The present application is a U.S. National Phase Application under 37 C.F.R. § 371 of International Patent Application No. PCT/CN2022/119537, filed Sep. 19, 2022, which claims priority to Chinese Patent Application No. 202111142672.2, filed on Sep. 28, 2021, the disclosures of which are incorporated herein by reference in their entireties.

FIELD

The disclosure relates to the field of data processing, and in particular to method, apparatus, device, and storage medium for generating a video.

BACKGROUND

With ongoing development of the multimedia short video technology, a video co-shooting function has been used by an increasing number of users.

A current video co-shooting function is implemented as follows: first, a short video satisfying a co-shooting condition is selected from an information stream by a user and skipped to a shooting page; and then, a co-shot resultant video with the short video is obtained after co-shooting with the short video by the user through a shooting device.

The current co-shooting function is unglamorous because it only allows co-shooting with the short video in the information stream. In consequence, user experience of entertainment of the co-shooting function is affected. Therefore, urgent technical problems of how to enrich the video co-shooting function and improve the user experience are to be solved immediately at present.

SUMMARY

In order to solve or at least partially solve the above technical problems, a method for generating a video is provided in an example of the disclosure, by which a co-shooting function of generating a co-shot resultant video based on a multimedia resource on each canvas is implemented by determining the multimedia resource corresponding to each canvas on a shooting page. Accordingly, a video co-shooting function is enriched, and user experience is improved.

In a first aspect, the disclosure provides a method for generating a video. The method includes:

displaying, in response to a triggering operation for a preset co-shooting control on a shooting page, at least two canvases on the shooting page;

determining multimedia resources corresponding to each of the at least two canvases respectively; and generating a co-shot resultant video based on the multimedia resources corresponding to the at least two canvases respectively.

In a second aspect, the disclosure further provides an apparatus for generating a video. The apparatus includes:

a display module configured to display, in response to a triggering operation for a preset co-shooting control on a shooting page, at least two canvases on the shooting page;

a determination module configured to determine multimedia resources corresponding to each of the at least two canvases respectively; and a generation module configured to generate a co-shot resultant video based on the multimedia resources corresponding to the at least two canvases respectively.

In a third aspect, the disclosure provides a computer-readable storage medium. The computer-readable storage medium stores instructions, where the instructions cause a terminal device to implement the above method when run on the terminal device.

In a fourth aspect, the disclosure provides a device. The device includes a memory, a processor, and a computer program stored on the memory and runnable on the processor, where the processor implements the above method when executing the computer program.

In a fifth aspect, the disclosure provides a computer program product. The computer program product includes a computer program/instruction, where the computer program/instruction implements the above method when executed by a processor.

Compared with the related art, the technical solutions according to the examples of the disclosure at least have the advantages as follows:

The method for generating a video is provided in the example of the disclosure. The method includes: first, displaying at least two canvases on the shooting page in response to the triggering operation for the preset co-shooting control on the shooting page: determining the multimedia resources corresponding to each of the at least two canvases respectively; and generating the co-shot resultant video based on the multimedia resource corresponding to each canvas. It can be seen that in the method for generating a video according to the example of the disclosure, the co-shooting function of generating the co-shot resultant video based on the multimedia resource on each canvas is implemented by determining the multimedia resource corresponding to each canvas on the shooting page. Accordingly, the video co-shooting function is enriched, and the user experience is improved.

BRIEF DESCRIPTION OF THE DRAWINGS

The accompanying drawings herein are incorporated in the description as a constituent part of the description, illustrate examples conforming to the disclosure, and serve to explain the principles of the disclosure along with the description.

In order to describe the technical solutions in examples of the disclosure or the related art more clearly, the accompanying drawings required for describing the examples or the related art will be briefly described below. Apparently, a person of ordinary skill in the art can also derive other accompanying drawings from these accompanying drawings without creative efforts.

DETAILED DESCRIPTION OF EMBODIMENTS

In order to have a clearer understanding of the above objectives, features, and advantages of the disclosure, the solutions of the disclosure are further described in details below: It should be noted that examples of the disclosure and the features in the examples can be mutually combined without conflicts.

In the following description, numerous specific details are set forth to provide a thorough understanding of the disclosure. However, the disclosure can also be implemented in other ways than those described herein. Therefore, the examples in the description are merely some examples rather than all examples of the disclosure.

A current co-shooting function is unglamorous because it only allows co-shooting with a specific short video in an information stream by a user. In consequence, user experience of entertainment of a video co-shooting function is affected.

In view of that, a method for generating a video is provided in an example the disclosure. The method includes: first, displaying, in response to a triggering operation for a preset co-shooting control on a shooting page, at least two canvases on the shooting page and, determining multimedia resources corresponding to each of the at least two respectively; and, generating a co-shot resultant video based on the multimedia resource corresponding to each canvas. It can be seen that in the method for generating a video according to the example of the disclosure, a co-shooting function of generating the co-shot resultant video based on the multimedia resource on each canvas is implemented by determining the multimedia resource corresponding to each canvas on the shooting page. Accordingly, the video co-shooting function is enriched, and the user experience is improved.

Figure 1:
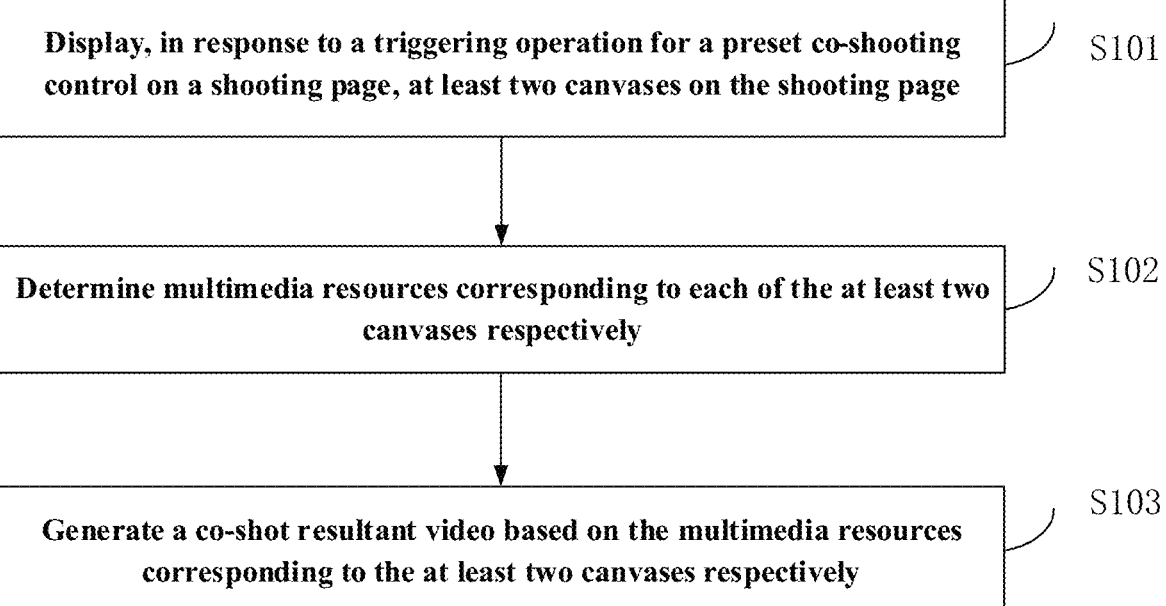
FIG. 1 is a flowchart of a method for generating a video according to an example of the disclosure.

On the basis of that, a method for generating a video is provided in the example of the disclosure. FIG. 1 is a flowchart of a method for generating a video according to an example of the disclosure. With reference to FIG. 1, the method includes:

S101: in response to a triggering operation for a preset co-shooting control on a shooting page, at least two canvases are displayed on the shooting page.

In the example of the disclosure, the triggering operation for the preset co-shooting control on the shooting page may be any operation for the preset co-shooting control, for example, an operation of clicking the preset co-shooting control, etc.

After the triggering operation for the preset co-shooting control on the shooting page is received, the at least two canvases are displayed on the shooting page. In some examples, for example, two, three, or four canvases may be displayed on the shooting page. The number of canvases displayed on the shooting page is not limited in the example of the disclosure.

Figure 2:
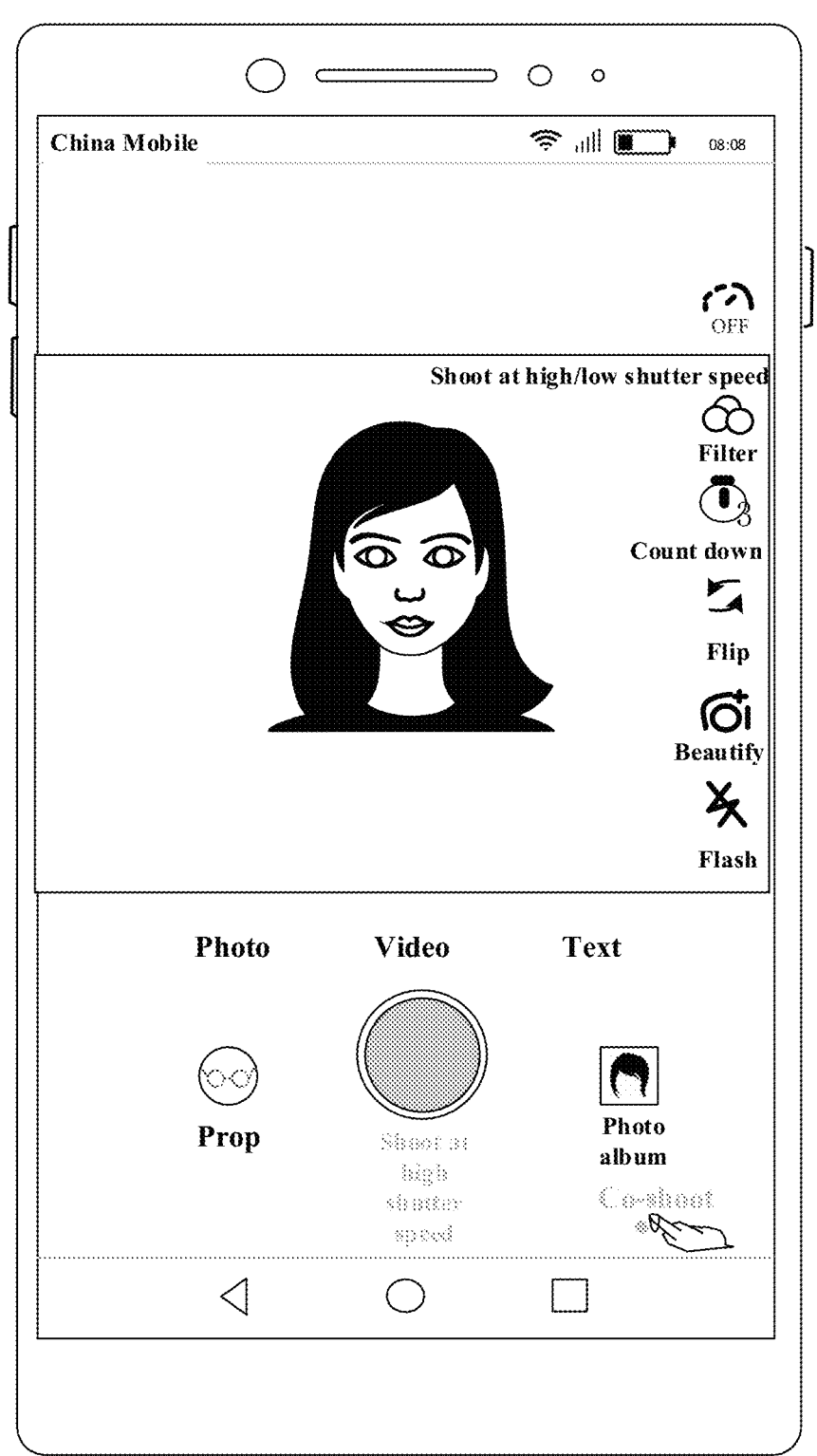
FIG. 2 is a schematic diagram of a shooting page according to an example of the disclosure.

FIG. 2 is a schematic diagram of a shooting page according to an example of the disclosure. As shown in FIG. 2, the preset co-shooting control is displayed on the shooting page shown in FIG. 2. A user may trigger a display effect of displaying at least two canvases on the shooting page by clicking the preset co-shooting control.

Figure 3:
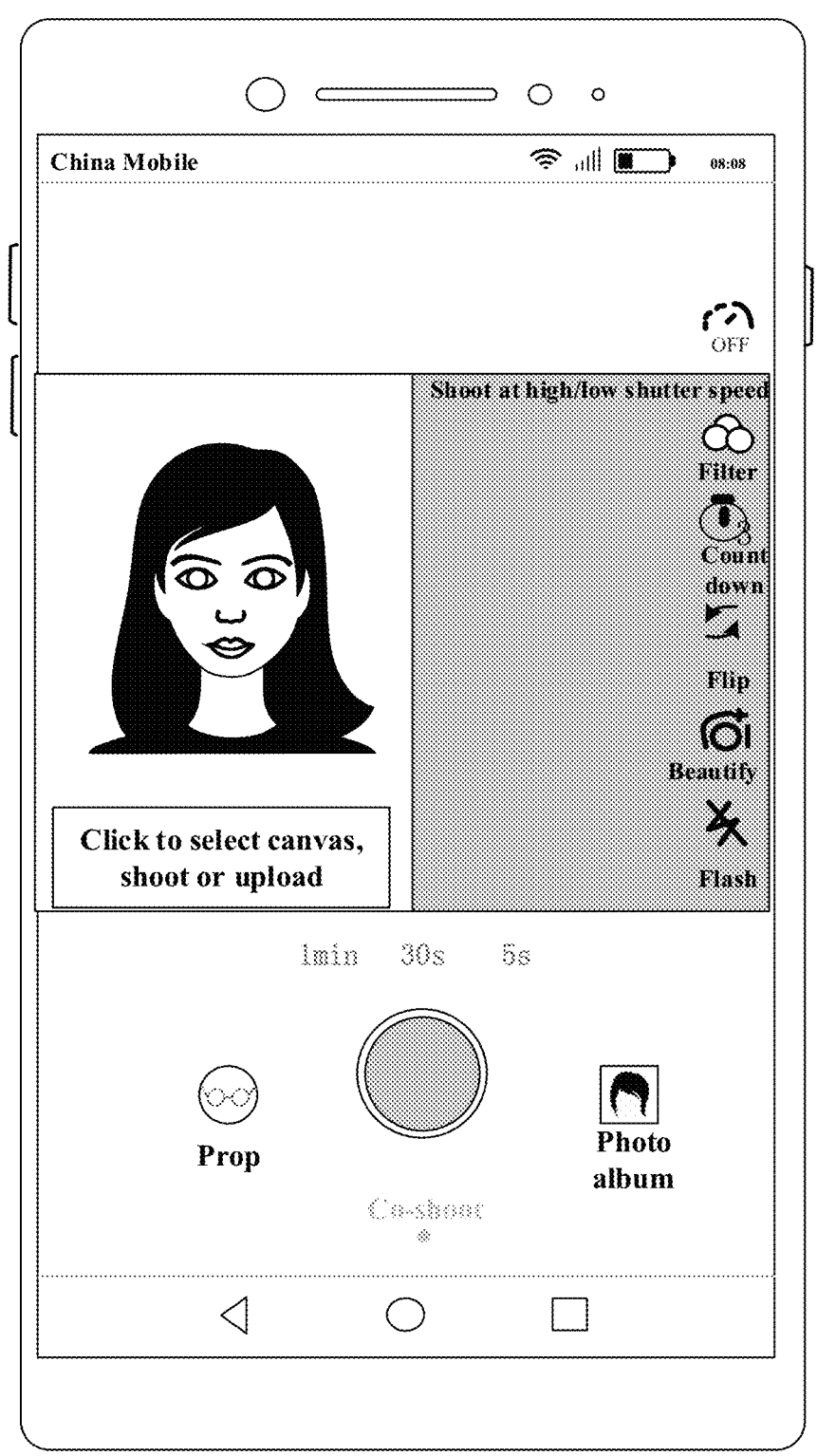
FIG. 3 is a schematic diagram of another shooting page according to an example of the disclosure.

FIG. 3 is a schematic diagram of another shooting page according to an example of the disclosure. As shown in FIG. 3, after the triggering operation for the preset co-shooting control on the shooting page shown in FIG. 2 is received, the display effect of the shooting page shown in FIG. 2 may be switched to a display effect of the shooting page shown in FIG. 3. The shooting page shown in FIG. 3 is a shooting page displaying two canvases.

In an embodiment, a left one of the two canvases displayed on the shooting page shown in FIG. 3 is selected by default, and a shooting preview picture, i.e., a current input picture of a camera of a shooting device, is displayed on the left canvas by default. Further, prompt information of "click to select canvas, shoot or upload" may also be displayed on the left canvas, so as to remind the user that a multimedia resource can be shot or uploaded for the selected canvas. Specifically, the prompt information may be displayed on the left canvas in the form of bubbles.

In another embodiment, when the triggering operation for the preset co-shooting control on the shooting page shown in FIG. 2 is received, and the shooting page shown in FIG. 2 is switched to the shooting page shown in FIG. 3, the user may manually click any canvas to select the canvas instead of selecting the canvas on the shooting page shown in FIG. 3 by default.

S102: multimedia resources corresponding to the at least two canvases are determined respectively.

The multimedia resource may include an image resource or a video resource.

In the example of the disclosure, under the condition that multiple canvases are displayed on the shooting page, the multimedia resources corresponding to all the canvases may be determined respectively in sequence. Specifically, an order for determining the multimedia resource for each canvas is not limited in the example of the disclosure.

In the example of the disclosure, before the multimedia resource corresponding to each canvas is determined, the canvas is first selected, so as to be in a selected state. Generally, the user may select any canvas on the shooting page by clicking the canvas, and then determine the multimedia resource for the canvas in the selected state.

It is assumed that the multiple canvases displayed on the shooting page include a first canvas below: The first canvas may be any canvas displayed on the shooting page.

In an embodiment, a multimedia resource corresponding to the first canvas may be determined based on a photo album page corresponding to a photo album entry on the shooting page when the first canvas is in a selected state.

In an application scenario, it is assumed that the at least two canvases displayed on the shooting page include canvas A and canvas B.

As shown in FIG. 3, the photo album entry is provided on the shooting page and configured to enter a photo album page of a current user. Assuming that the two canvases displayed on the shooting page shown in FIG. 3 are canvas A (on the left) and canvas B (on the right) respectively, and the first canvas may be canvas A, when canvas A is in a selected state, the user may enter the photo album page by clicking the photo album entry on the shooting page. Specifically, when a click operation for the photo album entry is received, a current shooting page may be skipped to the photo album page.

Figure 4:
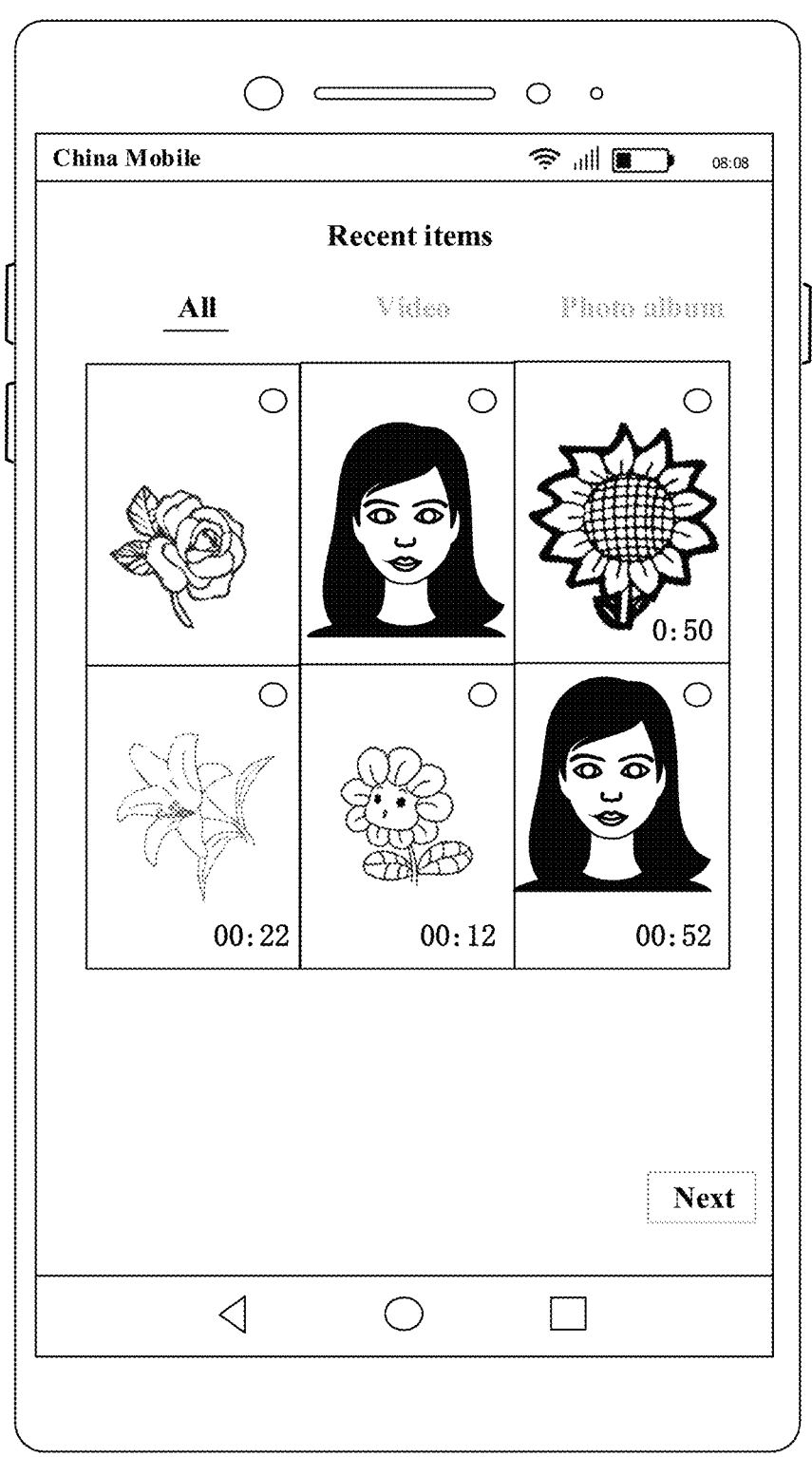
FIG. 4 is a schematic diagram of a photo album page according to an example of the disclosure.

FIG. 4 is a schematic diagram of a photo album page according to an example of the disclosure. A multimedia resource of the current user is displayed on the photo album page. The multimedia resource may specifically include a video resource and an image resource of the current user. The user may determine the multimedia resource corresponding to canvas A from the multimedia resource of the current user displayed on the photo album page.

In another embodiment, the multimedia resource corresponding to the first canvas may be determined in response to a triggering operation for a shooting control on the shooting page when the first canvas is in the selected state.

As shown in FIG. 3, the shooting control (also referred to as a shooting button) is provided on the shooting page. The shooting device may be triggered to start shooting by clicking the shooting control. Similarly, assuming that the two canvases displayed on the shooting page shown in FIG. 3 are canvas A (on the left) and canvas B (on the right) respectively, and the first canvas means canvas A, when canvas A is in the selected state, the user may start shooting by clicking the shooting control on the shooting page, and then determine a shot image resource or video resource as the multimedia resource corresponding to canvas A.

Canvas B (on the right) shown in FIG. 3 may also be understood with reference to the above multimedia resource determination mode, which will not be repeatedly described herein. It should be noted that after the multimedia resource corresponding to canvas A is determined, a system may automatically switch to a state in which canvas B is selected. Then the user may determine a multimedia resource of canvas B in the selected state by clicking the photo album entry or the shooting control.

If two or more canvases are displayed on the shooting page, after the multimedia resource corresponding to one canvas is determined, the system may automatically select any other canvas of which a multimedia resource is not determined, or the user may manually select another canvas. A way and an order for selecting the canvases are not limited in the example of the disclosure.

In the example of the disclosure, the user may customize the multimedia resource corresponding to any canvas on the shooting page, and therefore the video co-shooting function is enriched.

S103: a co-shot resultant video is generated based on the multimedia resources corresponding to the at least two canvases respectively.

In practical application, after the multimedia resource is determined for each canvas on the shooting page, the multimedia resources corresponding to all the canvases may be synthesized according to shortest duration of a video resource in the multimedia resources corresponding to all the canvases on the shooting page respectively, and the co-shot resultant video is generated. The co-shot resultant video includes the multimedia resource corresponding to each canvas on the shooting page.

In an embodiment, assuming that the multimedia resources corresponding to the multiple canvases on the shooting page include the video resource and the image resource, the multimedia resources corresponding to all the canvases may be synthesized according to the shortest duration of the video resource in the multimedia resources corresponding to all the canvases respectively, and the co-shot resultant video is generated. Specifically, the shortest duration is determined as duration of the co-shot resultant video, and a video resource longer than the duration is clipped.

Further, for the image resource, a video corresponding to the image resource may be generated based on the shortest duration, and the video and other video resources may be synthesized into the co-shot resultant video. The image resource is displayed in each video picture in the video corresponding to the image resource.

In another embodiment, assuming that the multimedia resources corresponding to the multiple canvases displayed on the shooting page respectively are image resources, the co-shot resultant video is generated based on the image resource corresponding to each canvas. A playing duration of the co-shot resultant video may be determined according to duration of a current shooting mode of the shooting page. For example, the playing duration of the co-shot resultant video equals to the duration of the current shooting mode. Alternatively, the playing duration of the co-shot resultant video may be determined according to the duration of the current shooting mode of the shooting page and duration of currently selected music. For example, the playing duration of the co-shot resultant video equals to shortest duration of the duration of the current shooting mode and the duration of the currently selected music.

For example, assuming that three canvases are displayed on the current shooting page, the three canvases correspond to three image resources respectively, the duration of the current shooting mode is 30 s, and the duration of the currently selected music is 10 s. In some examples, based on the shortest duration 10 s of the duration of the current shooting mode and the duration of the currently selected music, a co-shot resultant video not longer than 10 s is generated based on the three image resources. The image resources corresponding to the three canvases respectively are displayed in each frame of the co-shot resultant video.

In an embodiment, first, a corresponding video is generated for the image resource corresponding to each canvas. Specifically, duration of the video may equal to duration of the current shooting mode, or the shortest duration of the duration of the current shooting mode and the duration of the currently selected music. Then, the video of the image resource corresponding to each canvas is synthesized into the co-shot resultant video.

In another embodiment, first, the image resource corresponding to each canvas is synthesized into an image. Then, a video corresponding to the image is generated. Specifically, duration of the video may equal to duration of the current shooting mode, or the shortest duration of the duration of the current shooting mode and the duration of the currently selected music.

In the method for generating a video according to the example of the disclosure, in response to the triggering operation for the preset co-shooting control on the shooting page, at least two canvases are displayed on the shooting page: then, the multimedia resources corresponding to the at least two canvases are determined respectively; and finally, the co-shot resultant video is generated based on the multimedia resource corresponding to each canvas. It can be seen that in the example of the disclosure, the co-shooting function of generating the co-shot resultant video based on the multimedia resource on each canvas is implemented by determining the multimedia resource corresponding to each canvas on the shooting page. Accordingly, the video co-shooting function is enriched, and the user experience is improved.

On the basis of the contents in the above example, the way for determining the multimedia resource corresponding to the first canvas is further provided in the example of the disclosure. Specifically, first, the photo album page is displayed in response to a triggering operation for the photo album entry on the shooting page when the first canvas is in the selected state. Then, the multimedia resource corresponding to the first canvas is determined from the photo album page based on the duration of the current shooting mode on the shooting page.

The duration of the current shooting mode refers to a longest video shooting duration supported in the current shooting mode. As shown in FIG. 3, three shooting mode durations 15 s, 30 s and 1 min are displayed on the shooting page. After the current shooting mode is determined, the shooting mode duration corresponding to the current shooting mode is determined as the duration of the current shooting mode. The user may determine the duration of the current shooting mode based on user's own requirements. For example, if a video not longer than 15 s is desirable, the user may select 15s as the duration of the current shooting mode.

The first canvas may be any one of the at least two canvases displayed on the shooting page, and the canvas specifically indicated by the first canvas is not limited in the example of the disclosure. In some examples, the first canvas may be canvas A, canvas B, or any other canvas on the shooting page. For the sake of description, it is assumed that the first canvas is canvas A below.

In an embodiment, the multimedia resource corresponding to canvas A may be determined from the photo album page according to the duration of the current shooting mode of the shooting page. The duration of the multimedia resource corresponding to canvas A is not longer than the duration of the current shooting mode. For example, assuming that the duration of the current shooting mode of the shooting page is 30 s, a video that is not longer than 30 s may be selected from the photo album page as the multimedia resource corresponding to canvas A.

Figure 5:
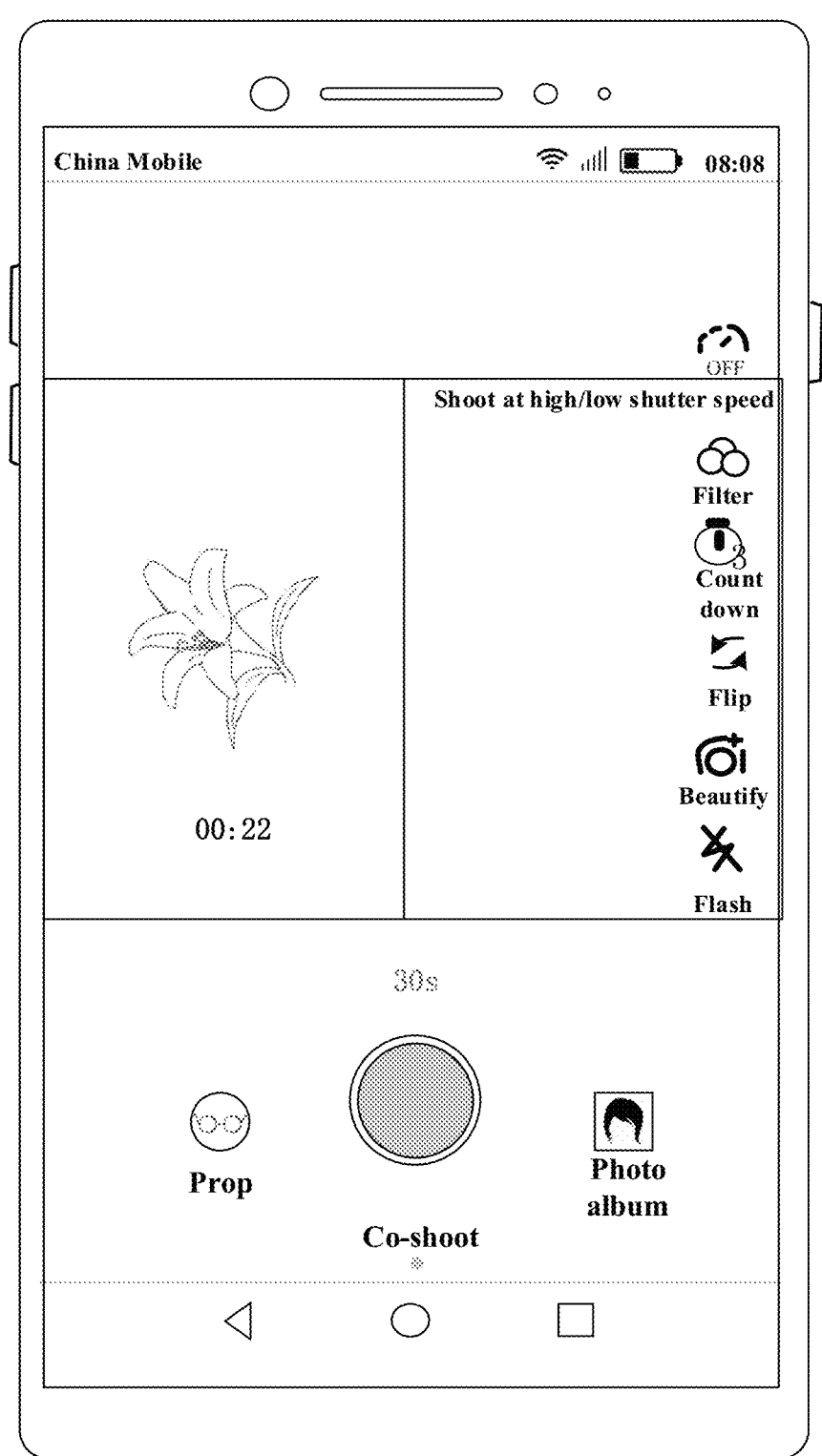
FIG. 5 is a schematic diagram of yet another shooting page according to an example of the disclosure.

FIG. 5 is a schematic diagram of yet another shooting page according to an example of the disclosure. As shown in FIG. 5, duration of a current shooting mode on the shooting page is 30 s. For canvas A (on the left) on the shooting page, the user may determine a video resource of 22 s from the multimedia resource of the current user displayed on the photo album page shown in FIG. 4 as the multimedia resource corresponding to canvas A.

Further, if the user selects a video resource longer than 30 s from the photo album page, the video resource may be clipped, so that duration corresponding to a clipped video resource is not longer than 30 s. Then, the clipped video resource is determined as the multimedia resource corresponding to canvas A. Reference can be made to aftermentioned embodiments for a specific clipping process, which will not be repeated herein.

In another embodiment, the multimedia resource corresponding to the first canvas may be determined from the photo album page based on duration of the current shooting mode of the shooting page and duration of currently selected music.

In some embodiments, the step that the multimedia resource corresponding to the first canvas may be determined from the photo album page based on duration of the current shooting mode of the shooting page and duration of currently selected music includes: shortest duration is determined from the duration of the current shooting mode of the shooting page and the duration of the currently selected music, and the multimedia resource corresponding to the first canvas is determined from the photo album page based on the shortest duration.

Specifically: the shortest duration is determined from the duration of the current shooting mode and the duration of the currently selected music. Then, the multimedia resource is determined for the first canvas from the photo album page based on the shortest duration. The duration of the multimedia resource determined for the first canvas is not longer than the shortest duration.

For example, assuming that the duration of the current shooting mode is 30 s, the duration of the currently selected music is 10 s, and the shortest duration determined from the duration of the current shooting mode and the duration of the currently selected music is 10 s, a video resource not longer than 10 s may be selected from the photo album page as the multimedia resource corresponding to canvas A. Further, if the user selects a video resource longer than 10 s from the photo album page, the video resource may be clipped, so that duration corresponding to a clipped video resource is not longer than 10 s. Then, the clipped video resource is determined as the multimedia resource corresponding to canvas A. Reference can be made to an aftermentioned embodiment for a specific clipping process, which will not be repeated herein.

In the example of the disclosure, the multimedia resource corresponding to canvas A may be determined from the photo album page or determined through shooting. Specifically, the way for determining the multimedia resource corresponding to canvas A through shooting is implemented as follows:

In an embodiment, shooting duration of the shooting device may also be determined according to the duration of the current shooting mode. In some examples, the shooting duration of the shooting device should not be longer than the duration of the current shooting mode. Alternatively: the shooting duration of the shooting device may also be determined according to the duration of the current shooting mode and the duration of the currently selected music. In some examples, the shooting duration of the shooting device should not be longer than the corresponding shortest duration of the duration of the current shooting mode and the duration of the currently selected music. Specifically, a multimedia resource shooting duration of the shooting device can be understood with reference to the above description of determining the duration of the multimedia resource corresponding to the first canvas from the photo album page, which will not be repeated herein.

In practical application, after the multimedia resource corresponding to canvas A is determined in any of the above ways, the determined multimedia resource may be rendered onto canvas A on the shooting page. Therefore, the multimedia resource is displayed on canvas A on the shooting page.

In an embodiment, the multimedia resource determined for canvas A may be rendered onto canvas A by a visual editor software development kit (VESDK) tool. For example, a video resource of 22 s selected from the photo album page in FIG. 4 may be rendered onto canvas A through the VESDK tool. Rendered canvas A is as shown in FIG. 5.

According to the method for generating a video according to the example of the disclosure, the user may customize the multimedia resource corresponding to each canvas. Accordingly, the resource contents of the co-shot resultant video are enriched, and co-shooting experience of the user is improved.

On the basis of the above example, under the condition that the multimedia resource is the video resource, another way for determining a multimedia resource for a canvas is provided in an example of the disclosure in order to prevent the multimedia resource determined for the canvas from occupying excessive system resources. Specifically, when a multimedia resource corresponding to a canvas not first selected is determined, duration of the multimedia resource determined for the canvas may be limited based on the shortest duration of the video resource in the determined multimedia resource on the shooting page.

In an embodiment, the first selected canvas on the shooting page is assumed to be canvas C. and a multimedia resource corresponding thereto may be determined based on any one of the embodiments in the above example, which will not be repeated herein.

Assuming that the multiple canvases displayed on the shooting page include a second canvas, after the multimedia resource corresponding to canvas C on the shooting page is determined, a multimedia resource corresponding to the second canvas may be determined based on the shortest duration of the video resource in the determined multimedia resource on the shooting page. The second canvas is any one of the multiple canvases displayed on the shooting page other than the first selected canvas. For the sake of description, it is assumed that the second canvas is canvas B below.

In an embodiment, the multimedia resource corresponding to canvas B may be determined from the photo album page. Specifically, the photo album page is displayed in response to a triggering operation for the photo album entry on the shooting page when the second canvas is in a selected state. Further, the multimedia resource corresponding to the second canvas is determined from the photo album page based on the shortest duration of the video resource in the determined multimedia resource on the shooting page. Specifically, a multimedia resource not longer than the shortest duration of the video resource in the determined multimedia resource is selected from the photo album page as the multimedia resource corresponding to the second canvas.

Figure 6:
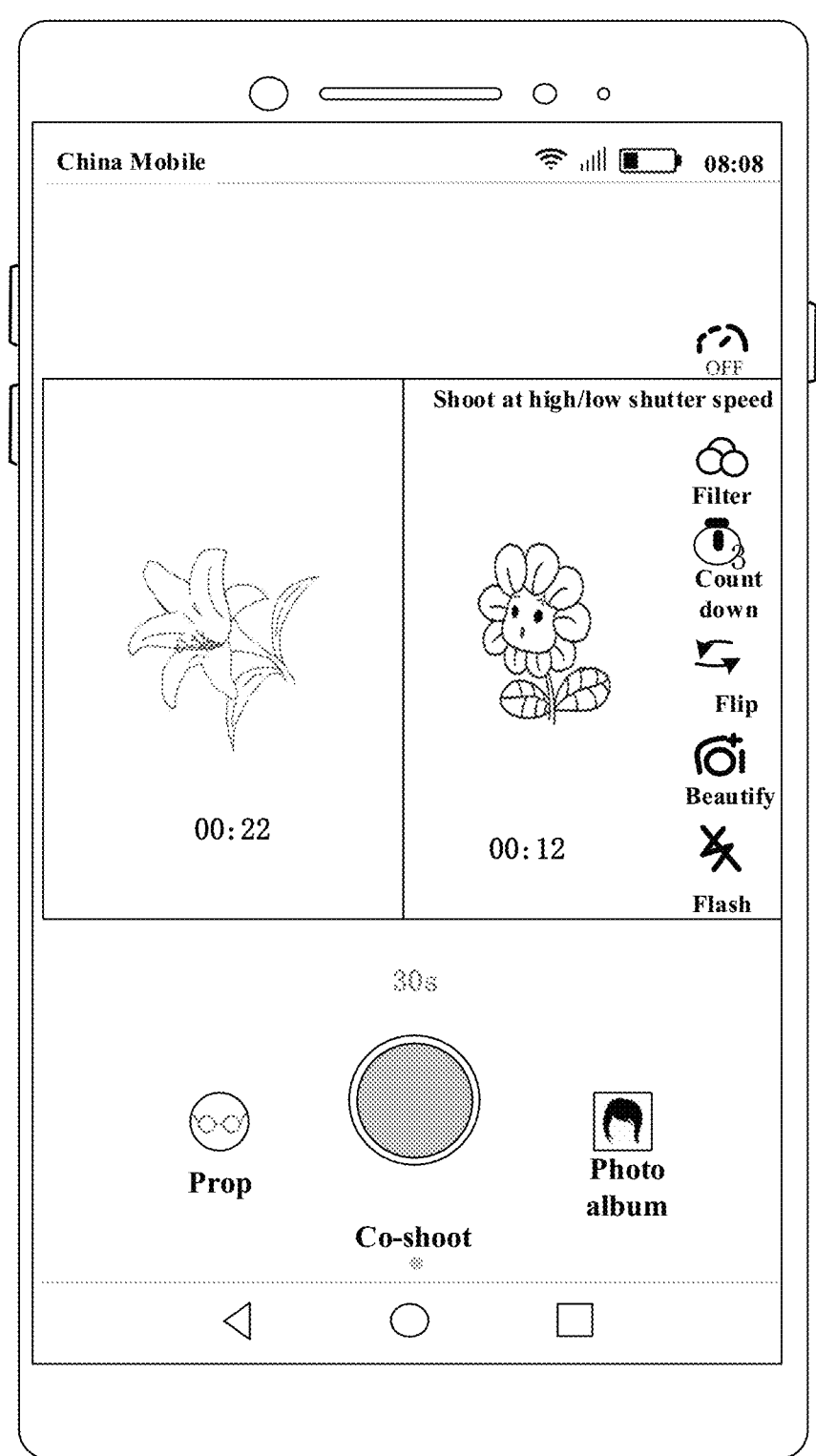
FIG. 6 is a schematic diagram of still another shooting page according to an example of the disclosure.

FIG. 6 is a schematic diagram of still another shooting page according to an example of the disclosure. As shown in FIG. 6, it is assumed that duration of a multimedia resource determined for canvas C (on the left) on the shooting page is 22 s. For canvas B (on the right) on the shooting page, a video resource not longer than 22 s may be selected from the photo album page as a multimedia resource corresponding to canvas B. As shown in FIG. 6, a video resource of 12 s is selected from the photo album page as the multimedia resource corresponding to canvas B.

In another embodiment, if the duration of the multimedia resource selected from the photo album page for the second canvas is longer than the shortest duration of the video resource in the determined multimedia resource on the shooting page, the multimedia resource selected from the photo album page for the second canvas is clipped. Then, a clipped multimedia resource is taken as the multimedia resource corresponding to the second canvas.

Specifically, if the duration of the multimedia resource selected from the photo album page for canvas B is longer than the shortest duration of the video resource in the determined multimedia resource, for example, longer than the duration 22 s of the multimedia resource corresponding to canvas C shown in FIG. 6, the multimedia resource may be clipped. Then, the clipped multimedia resource is taken as the multimedia resource corresponding to canvas B.

Assuming that the duration of the determined multimedia resource on canvas C on the shooting page is 22 s, if a video of 52 s on the photo album page is taken as the multimedia resource corresponding to canvas B, since the duration of the multimedia resource corresponding to canvas B is longer than 22 s, the multimedia resource may be clipped. Therefore, the duration of the clipped multimedia resource is not longer than 22 s, and the clipped multimedia resource is determined as the multimedia resource corresponding to canvas B.

In another embodiment, the shooting control may be directly triggered on the shooting page, and a shot image or video serves as the multimedia resource corresponding to canvas B.

In practical application, the shooting device starts shooting in response to a triggering operation for the shooting control on the shooting page when canvas B is in a selected state, and a shot image resource or video resource is taken as the multimedia resource corresponding to canvas B. Specifically, the duration of the multimedia resource corresponding to canvas B may be determined according to the shortest duration of the video resource in the determined multimedia resource on the shooting page.

In an embodiment, shooting duration for canvas B is determined based on the shortest duration of the video resource in the determined multimedia resource. For example, assuming that the shortest duration of the video resource in the determined multimedia resource is 22 s, a video shooting duration of the shooting device for canvas B is not longer than 22 s. After the shooting device completes shooting, a shot video resource having duration not longer than 22 s, or a shot image resource may be determined as the multimedia resource corresponding to canvas B.

According to the method for generating a video provided by the disclosure, the multimedia resource corresponding to each canvas on the shooting page is determined based on the shortest duration of the video resource in the determined multimedia resource on the shooting page. Accordingly, the multimedia resources determined for the canvases are prevented from occupying excessive system resources, and a generation efficiency of the co-shot resultant video is improved.

In view of the above scenario in which the multimedia resource is selected from the photo album page shown in FIG. 4 and required to be clipped, the way for clipping the multimedia resource is provided in an example of the disclosure.

In some embodiments, the step that the multimedia resource selected from the photo album page for the second canvas is clipped includes: a video clipping page is displayed in response to a selection operation for the multimedia resource on the photo album page: a selected multimedia resource is clipped based on a clipping standard frame; and a video clip positioned in the clipping standard frame is determined as the clipped multimedia resource; where duration of the multimedia resource in the clipping standard frame is not longer than the shortest duration of the video resource in the determined multimedia resource on the shooting page.

Figure 7:
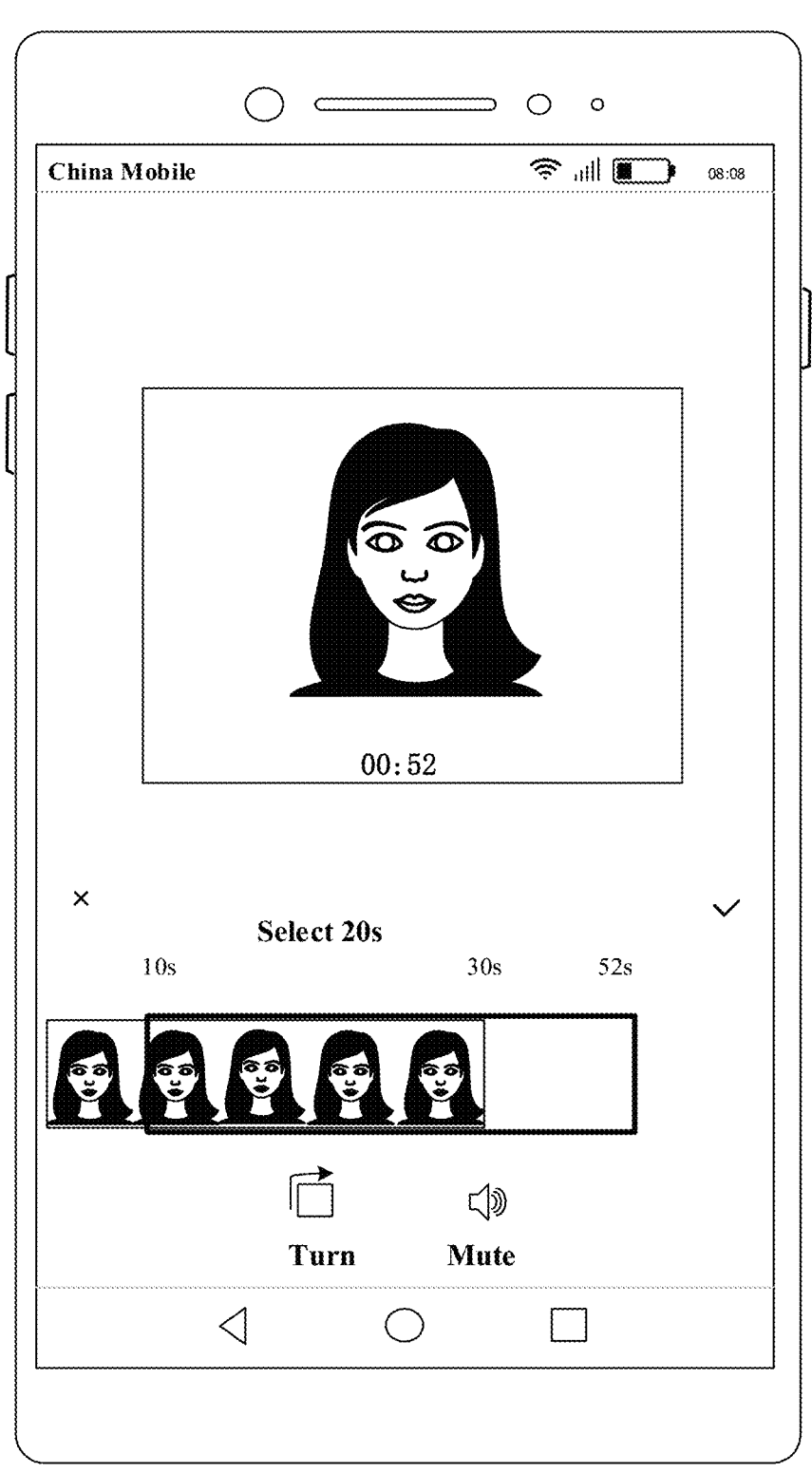
FIG. 7 is a schematic diagram of a video clipping page according to an example of the disclosure.

Specifically, in response to the selection operation for the multimedia resource on the photo album page shown in FIG. 4, the photo album page is skipped to a video clipping page shown in FIG. 7, and the selected multimedia resource may be clipped on the video clipping page. On the video clipping page, the selected multimedia resource may be clipped based on the clipping standard frame. Specifically, the video clip positioned in the clipping standard frame is determined as the clipped multimedia resource.

In some embodiments, a length of the clipping standard frame may be determined based on the duration of the current shooting mode. Duration of the video clip positioned in the clipping standard frame is not longer than that of the current shooting mode.

In some embodiments, a length of the clipping standard frame may be determined based on the duration of the current shooting mode and the duration of the currently selected music. Duration of the video clip positioned in the clipping standard frame is not longer than the shortest duration of the duration of the current shooting mode and the duration of the currently selected music.

In some embodiments, a length of the clipping standard frame may also be determined based on the shortest duration of the video resource in the determined multimedia resource on the shooting page. Duration of the video clip positioned in the clipping standard frame is not longer than the shortest duration of the video resource in the determined multimedia resource on the shooting page.

FIG. 7 is a schematic diagram of a video clipping page according to an example of the disclosure. With reference to FIG. 7.

Assuming that the multimedia resource corresponding to canvas C has duration of 22 s, and the multimedia resource selected from the photo album page for canvas B has duration of 52 s, the multimedia resource may be clipped based on the video clipping page shown in FIG. 7. Specifically, the user drags a video frame picture in the multimedia resource to position the video frame picture to be synthesized into the co-shot resultant video in the clipping standard frame. When dragging the video frame picture in the multimedia resource, the user may select the multimedia resource corresponding to canvas B.

Specifically, the video frame picture in the multimedia resource may be dragged into the clipping standard frame, so as to select any video resource not longer than 22 s from 0 s to 52 s of the multimedia resource. For example, the video resource positioned in the clipping standard frame may correspond to a portion between 10 s and 30 s of the multimedia resource, ensuring that the duration of the clipped multimedia resource is not longer than 22 s.

Clipping processes of multimedia resources corresponding to other canvases can be understood with reference to the above clipping process, which will not be repeated herein.

On the basis of the above example, in the example of the disclosure, a display layout of the at least two canvases displayed on the shooting page may be switched. Specifically, before the co-shot resultant video is generated, in response to a switching operation for a current display layout of at least two canvases displayed on the shooting page, each canvas is displayed on the shooting page based on a display layout after switching corresponding to the switching operation.

In the example of the disclosure, a layout display manner may include a left-right layout manner, a scene stealing layout manner, an up-down layout manner, an up-middle-down layout manner, a grid-shaped layout manner, a pentagonal layout manner, a hexagonal layout manner, etc. The layout display manner is diversified and is not limited to the above display layout manners.

In practical application, when a selection operation for any one of the above layout display manners is received, the current display layout of the canvases on the shooting page may be switched to a layout display manner corresponding to the selection operation.

Figure 8:
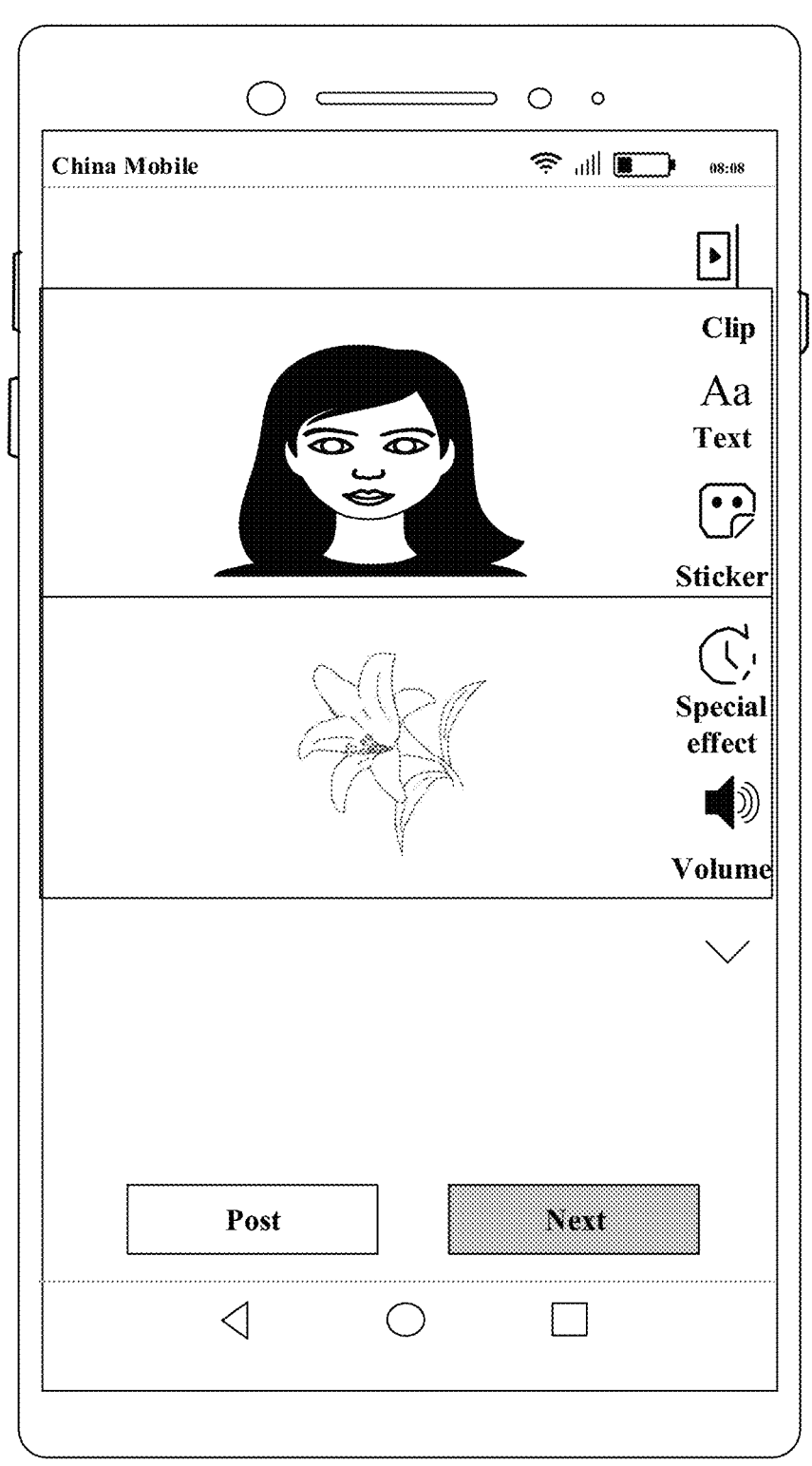
FIG. 8 is a schematic diagram of a video editing page according to an example of the disclosure.

After the multimedia resource corresponding to each canvas on the shooting page is determined, the co-shot resultant video is generated based on the current display layout of each canvas and the multimedia resource corresponding to each canvas. FIG. 8 is a schematic diagram of a video editing page according to an example of the disclosure. As shown in FIG. 8, the multimedia resources corresponding to the two canvases displayed in the up-down layout manner respectively are displayed on the video editing page. After clicking a "post" or 'next' control, the user can post the generated co-shot resultant video.

In an embodiment, the layout display manner may be switched at any time before the co-shot resultant video is generated. The user may customize the layout display manner on the shooting page according to user's own preference. For example, the layout display manner on the shooting page shown in FIG. 6 is the left-right layout mode. If switching the layout is selected, the layout display manner on the shooting page shown in FIG. 6 may be switched to the up-down layout manner.

In the example of the disclosure, the user may customize the layout display manner on the shooting page according to the user's own preference. Therefore, the co-shooting function is enriched, and the user experience is improved.

Figure 9:
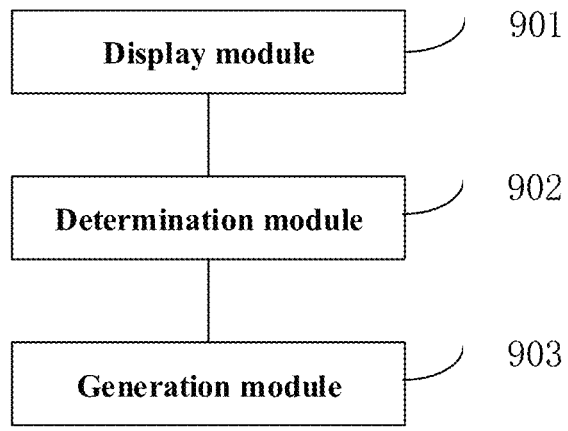
FIG. 9 is a schematic structural diagram of an apparatus for generating a video according to an example of the disclosure.

On the basis of the above method examples, the disclosure further provides an apparatus for generating a video. FIG. 9 is a schematic structural diagram of an apparatus for generating a video according to an example of the disclosure. With reference to FIG. 9, the apparatus includes:

a display module 901 configured to display, in response to a triggering operation for a preset co-shooting control on a shooting page, at least two canvases on the shooting page;

a determination module 902 configured to determine multimedia resources corresponding to each of the at least two canvases respectively; and A generation module 903 configured to generate a co-shot resultant video based on the multimedia resources corresponding to the at least two canvases respectively.

In an embodiment, the at least two canvases include a first canvas, and the determination module includes:

a first determination sub-module configured to determine a multimedia resource corresponding to the first canvas based on a photo album page corresponding to a photo album entry on the shooting page when the first canvas is in a selected state; and A second determination sub-module configured to determine a multimedia resource corresponding to the first canvas in response to a triggering operation for a shooting control on the shooting page when the first canvas is in a selected state.

In an embodiment, when the first canvas is in the selected state, the first determination sub-module includes:

a first display module configured to display the photo album page in response to a triggering operation for the photo album entry on the shooting page when the first canvas is in the selected state; and A third determination sub-module configured to determine a multimedia resource corresponding to the first canvas from the photo album page based on duration of a current shooting mode of the shooting page.

In an embodiment, the third determination sub-module includes:

A fourth determination sub-module configured to determine a multimedia resource corresponding to the first canvas from the photo album page based on the duration of the current shooting mode of the shooting page and duration of currently selected music.

In an embodiment, the fourth determination sub-module is specifically configured to determine shortest duration from the duration of the current shooting mode of the shooting page and the duration of the currently selected music, and determine the multimedia resource corresponding to the first canvas from the photo album page based on the shortest duration.

In an embodiment, the at least two canvases include a second canvas, and the determination module includes:

a fifth determination sub-module configured to determine a multimedia resource for the second canvas based on shortest duration of a video resource in a determined multimedia resource on the shooting page: wherein the determined multimedia resource includes the video resource.

In an embodiment, the fifth determination sub-module includes:

a second display module configured to display the photo album page in response to a triggering operation for the photo album entry on the shooting page when the second canvas is in a selected state; and A sixth determination sub-module configured to determine a multimedia resource corresponding to the second canvas from the photo album page based on the shortest duration of the video resource in the determined multimedia resource on the shooting page.

In an embodiment, the fifth determination sub-module includes:

A seventh determination sub-module configured to determine a multimedia resource corresponding to the second canvas based on the shortest duration of the video resource in the determined multimedia resource on the shooting page in response to a triggering operation for a shooting control on the shooting page when the second canvas is in a selected state.

In an embodiment, the determination module further includes:

A clipping sub-module configured to clip, in response to determining that duration of a multimedia resource selected from the photo album page for the second canvas is longer than the shortest duration of the video resource in the determined multimedia resource on the shooting page, the multimedia resource selected from the photo album page for the second canvas, and take a clipped multimedia resource as the multimedia resource corresponding to the second canvas.

In an embodiment, the clipping sub-module is specifically configured to display a video clipping page in response to a selection operation for the multimedia resource on the photo album page: clip a selected multimedia resource based on a clipping standard frame; and determine a video resource positioned in the clipping standard frame as the clipped multimedia resource: where duration of the multimedia resource positioned in the clipping standard frame is not longer than the shortest duration of the video resource in the determined multimedia resource on the shooting page.

In an embodiment, the generation module further includes:

A display sub-module configured to display, in response to a switching operation for a current display layout of the at least two canvases, the at least two canvases on the shooting page based on a display layout after switching corresponding to the switching operation. In an embodiment, the generation module further includes:

A first generation sub-module configured to synthesize the multimedia resources corresponding to the at least two canvases respectively according to shortest duration of a video resource in the multimedia resources corresponding to the at least two canvases respectively, and generate the co-shot resultant video.

In the apparatus for generating a video according to the example of the disclosure, first, in response to the triggering operation for the preset co-shooting control on the shooting page, at least two canvases are displayed on the shooting page: the multimedia resources corresponding to each of the at least two canvases are determined respectively; and the co-shot resultant video is generated based on the multimedia resource corresponding to each canvas. It can be seen that in the method for generating a video according to the example of the disclosure, the co-shooting function of generating the co-shot resultant video based on the multimedia resource on each canvas is implemented by determining the multimedia resource corresponding to each canvas on the shooting page. Accordingly, the video co-shooting function is enriched, and the user experience is improved.

Except for the above method and apparatus, a computer-readable storage medium is further provided in an example of the disclosure. The computer-readable storage medium stores instructions, where the instructions cause a terminal device to implement the method for generating a video according to the example of the disclosure when running on the terminal device.

A computer program product is further provided in an example of the disclosure. The computer program product includes a computer program/instruction, where the computer program/instruction implements the method for generating a video according to the example of the disclosure when executed by a processor.

Figure 10:
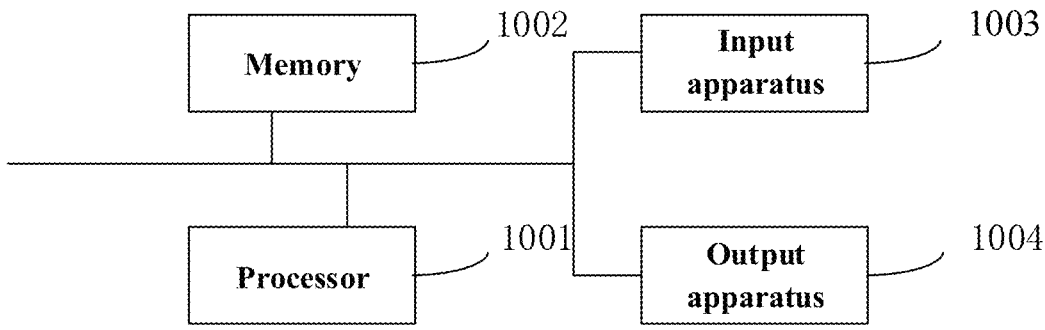
FIG. 10 is a schematic structural diagram of a device for generating a video according to an example of the disclosure.

Further, a device for generating a video is further provided in an example of the disclosure. With reference to FIG. 10, the device may include:

a processor 1001, a memory 1002, an input apparatus 1003, and an output apparatus 1004. One or more processors 1001 may be configured in the device for generating a video. One processor is shown in FIG. 10 as an example. In some examples of the disclosure, the processor 1001, the memory 1002, the input apparatus 1003, and the output apparatus 1004 may be connected through a bus, etc. Connection through a bus is shown in FIG. 10 as an example.

The memory 1002 may be configured to store a software program or a module. The processor 1001 runs the software program or the module stored in the memory 1002 to execute various function applications and data processing of the device for generating a video. The memory 1002 may primarily include a program storage area and a data storage area. The program storage area may store an operation system, an application required by at least one function, etc. In addition, the memory 1002 may include a high-speed random access memory, a non-volatile memory, such as at least one magnetic disk storage device and a flash memory device, or other volatile solid-state storage devices. The input apparatus 1003 may be configured to receive input digital or character information and generate a signal input relevant to user settings and function control of the device for generating a video.

Specifically, in the example, the processor 1001 loads executable files corresponding to processes of one or more applications into the memory 1002 according to the following instruction. The processor 1001 runs the application stored in the memory 1002, so as to implement various functions of the above device for generating a video.

It should be noted that the relation terms herein such as "first" and "second" are merely used to distinguish one entity or operation from another entity or operation without necessarily requiring or implying any such an actual relation or order between these entities or operations. Moreover, the terms "comprise", "include", "encompass", or any their other variations are intended to cover non-exclusive inclusion. Therefore, a process, method, article, or device including a series of elements not only includes those elements, but also includes other elements that are not explicitly listed, or further includes inherent elements of such a process, method, article, or device. Without more restrictions, the elements defined by the sentence "comprising a . . . " and "including a . . . " do not exclude the existence of other identical elements in the process, method, article, or device including the elements.

What are described above are merely the particular embodiments of the disclosure, through which those skilled in the art can understand or practice the disclosure. Various modifications to these examples will be apparent to those skilled in the art, and the general principles defined herein can be implemented in other examples without departing from the spirit or scope of the disclosure. Thus, the disclosure accords with the widest scope consistent with the principles and novel features disclosed herein instead of being limited to the examples described herein.

I claim:

1. A method for generating a video, comprising:
displaying, in response to a triggering operation for a preset co-shooting control on a shooting page, at least two canvases on the shooting page;
determining one or more multimedia resources corresponding to each canvas of the at least two canvases, respectively; and
generating a co-shot resultant video based on the one or more multimedia resources corresponding to each canvas of the at least two canvases, respectively,
wherein determining the one or more multimedia resources corresponding to each canvas of the at least two canvases, respectively, includes:
determining the one or more multimedia resources corresponding to each canvas based on a photo album page corresponding to a photo album entry on the shooting page; or determining the one or more multimedia resources corresponding to each canvas in response to a triggering operation for a shooting control on the shooting page.

2. The method of claim 1, wherein the at least two canvases comprise a first canvas; and wherein the determining one or more multimedia resources corresponding to each canvas of the at least two canvases, respectively, comprises:
determining a first multimedia resource corresponding to the first canvas based on the photo album page corresponding to the photo album entry on the shooting page when the first canvas is in a selected state; or,
determining a second multimedia resource corresponding to the first canvas in response to the triggering operation for the shooting control on the shooting page when the first canvas is in a selected state.

3. The method of claim 2, wherein the determining a first multimedia resource corresponding to the first canvas based on a photo album page corresponding to a photo album entry on the shooting page when the first canvas is in a selected state comprises:
displaying the photo album page in response to a triggering operation for the photo album entry on the shooting page when the first canvas is in the selected state; and determining the first multimedia resource corresponding to the first canvas from the photo album page based on a duration of a current shooting mode of the shooting page.

4. The method of claim 3, wherein the determining the first multimedia resource corresponding to the first canvas from the photo album page based on a duration of a current shooting mode of the shooting page comprises:
determining the first multimedia resource corresponding to the first canvas from the photo album page based on the duration of the current shooting mode of the shooting page and a duration of currently selected music.

5. The method of claim 4, wherein the determining the first multimedia resource corresponding to the first canvas from the photo album page based on the duration of the current shooting mode of the shooting page and a duration of currently selected music comprises:
determining a shorter duration between the duration of the current shooting mode of the shooting page and the duration of the currently selected music; and
determining the first multimedia resource corresponding to the first canvas from the photo album page based on the shorter duration.

6. The method of claim 1, wherein the at least two canvases comprise a second canvas; and wherein the determining one or more multimedia resources corresponding to the at least two canvases respectively comprises:
determining a multimedia resource corresponding to the second canvas based on a duration of a video resource in a determined multimedia resource on the shooting page; wherein the determined multimedia resource includes the video resource.

7. The method of claim 6, wherein the determining a multimedia resource corresponding to the second canvas based on a duration of a video resource in a determined multimedia resource on the shooting page comprises:
displaying a photo album page in response to a triggering operation for a photo album entry on the shooting page when the second canvas is in a selected state; and
determining the multimedia resource corresponding to the second canvas from the photo album page based on the duration of the video resource in the determined multimedia resource on the shooting page.

8. The method of claim 6, wherein the determining a multimedia resource corresponding to the second canvas based on a duration of a video resource in a determined multimedia resource on the shooting page comprises:
determining the multimedia resource corresponding to the second canvas based on the duration of the video resource in the determined multimedia resource on the shooting page in response to a triggering operation for a shooting control on the shooting page when the second canvas is in a selected state.

9. The method of claim 1, wherein the at least two canvases comprise a second canvas; and wherein the determining one or more multimedia resources corresponding to the at least two canvases respectively comprises:
clipping, in response to determining that a duration of a multimedia resource selected from a photo album page for the second canvas is longer than a duration of a video resource in a determined multimedia resource on the shooting page, the multimedia resource selected from the photo album page for the second canvas to generate a clipped multimedia resource; and
assigning the clipped multimedia resource as a multimedia resource corresponding to the second canvas.

10. The method of claim 9, wherein the clipping the multimedia resource selected from the photo album page for the second canvas comprises:

displaying a video clipping page in response to a selection operation for the multimedia resource selected from the photo album page;

clipping the selected multimedia resource based on a clipping standard frame; and determining a video resource positioned in the clipping standard frame as the clipped multimedia resource;

wherein a duration of the clipping standard frame is not longer than a duration of the video resource in the determined multimedia resource on the shooting page.

11. The method of claim 1, further comprising:

before generating the co-shot resultant video based on the one or more multimedia resources corresponding to each canvas of the at least two canvases respectively, displaying, in response to a switching operation for a current display layout of the at least two canvases, the at least two canvases on the shooting page based on a display layout after switching corresponding to the switching operation.

12. The method of claim 1, wherein the generating a co-shot resultant video based on the one or more multimedia resources corresponding to each canvas of the at least two canvases respectively comprises:

synthesizing the one or more multimedia resources corresponding to the at least two canvases respectively according to a duration of a video resource in the one or more multimedia resources corresponding to the at least two canvases respectively to generate the co-shot resultant video.

13. A non-transitory computer-readable storage medium storing instructions thereon, wherein the instructions, when executed by one or more processors, cause the one or more processors to perform operations comprising:

displaying, in response to a triggering operation for a preset co-shooting control on a shooting page, at least two canvases on the shooting page;

determining one or more multimedia resources corresponding to each canvas of the at least two canvases, respectively; and generating a co-shot resultant video based on the one or more multimedia resources corresponding to each canvas of the at least two canvases, respectively, wherein determining the one or more multimedia resources corresponding to each canvas of the at least two canvases, respectively, includes:

determining the one or more multimedia resources corresponding to each canvas based on a photo album page corresponding to a photo album entry on the shooting page;

or determining the one or more multimedia resources corresponding to each canvas in response to a triggering operation for a shooting control on the shooting page.

14. The non-transitory computer-readable storage medium of claim 13, wherein the at least two canvases comprise a first canvas;

wherein the determining one or more multimedia resources corresponding to each canvas of the at least two canvases, respectively, comprises:

determining a first multimedia resource corresponding to the first canvas based on the photo album page corresponding to the photo album entry on the shooting page when the first canvas is in a selected state; or, determining a second multimedia resource corresponding to the first canvas in response to the triggering operation for the shooting control on the shooting page when the first canvas is in a selected state.

15. The non-transitory computer-readable storage medium of claim 14, wherein the determining a first multimedia resource corresponding to the first canvas based on a photo album page corresponding to a photo album entry on the shooting page when the first canvas is in a selected state comprises:

displaying the photo album page in response to a triggering operation for the photo album entry on the shooting page when the first canvas is in the selected state; and determining the first multimedia resource corresponding to the first canvas from the photo album page based on a duration of a current shooting mode of the shooting page.

16. A device for generating a video, comprising:

one or more memories storing instructions thereon; and one or more processors configured to execute the instructions and perform the operations comprising:

displaying, in response to a triggering operation for a preset co-shooting control on a shooting page, at least two canvases on the shooting page;

determining one or more multimedia resources corresponding to each canvas of the at least two canvases, respectively; and generating a co-shot resultant video based on the one or more multimedia resources corresponding to each canvas of the at least two canvases, respectively, wherein determining the one or more multimedia resources corresponding to each canvas of the at least two canvases, respectively, includes:

determining the one or more multimedia resources corresponding to each canvas based on a photo album page corresponding to a photo album entry on the shooting page; or determining the one or more multimedia resources corresponding to each canvas in response to a triggering operation for a shooting control on the shooting page.

17. The device of claim 16, wherein the at least two canvases comprise a first canvas; and wherein the determining one or more multimedia resources corresponding to each canvas of the at least two canvases, respectively, comprises:

determining a first multimedia resource corresponding to the first canvas based on the photo album page corresponding to the photo album entry on the shooting page when the first canvas is in a selected state; or, determining a second multimedia resource corresponding to the first canvas in response to the triggering operation for the shooting control on the shooting page when the first canvas is in a selected state.

18. The device of claim 17, wherein the determining a first multimedia resource corresponding to the first canvas based on a photo album page corresponding to a photo album entry on the shooting page when the first canvas is in a selected state comprises:

displaying the photo album page in response to a triggering operation for the photo album entry on the shooting page when the first canvas is in the selected state; and determining the first multimedia resource corresponding to the first canvas from the photo album page based on a duration of a current shooting mode of the shooting page.

19. The device of claim 18, wherein the determining the first multimedia resource corresponding to the first canvas from the photo album page based on a duration of a current shooting mode of the shooting page comprises:

determining the first multimedia resource corresponding to the first canvas from the photo album page based on the duration of the current shooting mode of the shooting page and a duration of currently selected music.

20. The device of claim 19, wherein the determining the first multimedia resource corresponding to the first canvas from the photo album page based on the duration of the current shooting mode of the shooting page and a duration of currently selected music comprises:

determining a shorter duration between the duration of the current shooting mode of the shooting page and the duration of the currently selected music; and determining the first multimedia resource corresponding to the first canvas from the photo album page based on the shorter duration.

* * * * *